(12) United States Patent
Fujimura et al.

(10) Patent No.: US 12,479,460 B2
(45) Date of Patent: Nov. 25, 2025

(54) CONTROL DEVICE, CONTROL METHOD, AND STORAGE MEDIUM

(71) Applicant: HONDA MOTOR CO., LTD., Tokyo (JP)

(72) Inventors: Kotaro Fujimura, Wako (JP); Atsushi Kato, Wako (JP); Shigenobu Saigusa, Wako (JP); Gakuyo Fujimoto, Wako (JP); Misako Yoshimura, Wako (JP); Masamitsu Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 168 days.

(21) Appl. No.: 18/373,301

(22) Filed: Sep. 27, 2023

(65) Prior Publication Data
US 2024/0109554 A1 Apr. 4, 2024

(30) Foreign Application Priority Data
Sep. 29, 2022 (JP) ................. 2022-157038

(51) Int. Cl.
*B60W 50/16* (2020.01)
*B60W 30/09* (2012.01)
(Continued)

(52) U.S. Cl.
CPC ............ *B60W 50/16* (2013.01); *B60W 30/09* (2013.01); *B60W 30/0956* (2013.01);
(Continued)

(58) Field of Classification Search
CPC .. B60W 50/16; B60W 30/09; B60W 30/0956; B60W 30/146; B60W 2050/143;
(Continued)

(56) References Cited

U.S. PATENT DOCUMENTS 9,508,000 B2 * 11/2016 Iwasaki ................. G06V 20/58
11,072,367 B2 * 7/2021 Ohtani ............... B62D 15/0285
(Continued)

FOREIGN PATENT DOCUMENTS

| JP | 2005-049914 | 2/2005 |
| JP | 2018-022229 | 2/2018 |
| JP | 2018-181061 | 11/2018 |

OTHER PUBLICATIONS

Japanese Office Action for Japanese Patent Application No. 2022-157038 mailed Sep. 9, 2025.

*Primary Examiner* — Mohamed Barakat
(74) *Attorney, Agent, or Firm* — Amin, Turocy & Watson, LLP

(57) ABSTRACT

A control device is configured to perform: performing a first process when an index value indicating a degree of closeness to a risky object which is present in front of a mobile object is less than a first threshold value; performing a second process when the index value is equal to or greater than the first threshold value and less than a second threshold value greater than the first threshold value; and performing a third process and the second process when the index value is equal to or greater than the second threshold value. The third process includes a fourth process of proposing a driving operation for avoiding the risky object to a driver. The fourth process is not performed when the driver has performed an action for reducing or releasing an operation of an operator instructing an accelerating operation for accelerating the mobile object.

10 Claims, 13 Drawing Sheets

(51) Int. Cl.
    *B60W 30/095*     (2012.01)
    *B60W 30/14*     (2006.01)
    *B60W 50/14*     (2020.01)

(52) U.S. Cl.
    CPC ..... *B60W 30/146* (2013.01); *B60W 2050/143* (2013.01); *B60W 2050/146* (2013.01); *B60W 2540/106* (2013.01); *B60W 2554/802* (2020.02)

(58) Field of Classification Search
    CPC ..... B60W 2050/146; B60W 2540/106; B60W 2554/802
    See application file for complete search history.

(56) References Cited

U.S. PATENT DOCUMENTS

| | | | | |
|---|---|---|---|---|
| 2008/0252466 | A1* | 10/2008 | Yopp | B60K 28/066 340/576 |
| 2017/0158127 | A1* | 6/2017 | Akiyama | B60W 50/14 |
| 2017/0240170 | A1* | 8/2017 | Tani | G05D 1/024 |
| 2019/0193726 | A1* | 6/2019 | Ishikawa | B60Q 1/44 |
| 2020/0117203 | A1* | 4/2020 | Yang | G08G 1/0133 |
| 2020/0307640 | A1* | 10/2020 | Tsuji | G05D 1/0268 |

* cited by examiner

CONTROL DEVICE, CONTROL METHOD, AND STORAGE MEDIUM

CROSS-REFERENCE TO RELATED APPLICATION

Priority is claimed on Japanese Patent Application No. 2022-157038, filed Sep. 29, 2022, the content of which is incorporated herein by reference.

BACKGROUND

Field

The present invention relates to a control device, a control method, and a storage medium.

Description of Related Art

In the related art, a safe driving action notification system that determines whether notification is to be performed on the basis of a comparison between a driving action to be taken by a driver and a driving action predicted using a driving action model generated from previous driving actions which have been calculated from positions of obstacles and that notifies the driver of information indicating an action to be performed by the driver when it is determined that notification is to be performed is disclosed (Japanese Unexamined Patent Application, First Publication No. 2018-22229).

SUMMARY

However, in the related art, it may not be possible to provide information in satisfactory consideration of a driver's intention.

The present invention was made in consideration of the aforementioned circumstances and an objective thereof is to provide a control device, a control method, and a storage medium that can provide information in which a driver's intention is reflected.

A control device, a control method, and a storage medium according to the present invention employ the following configurations.

(1) According to an aspect of the present invention, a control device is provided and configured to perform: performing a first process when an index value indicating a degree of closeness to a risky object which is present in front of a mobile object is less than a first threshold value; performing a second process different from the first process when the index value is equal to or greater than the first threshold value and less than a second threshold value greater than the first threshold value; and performing a third process different from the first process and the second process when the index value is equal to or greater than the second threshold value, wherein the third process includes a fourth process of proposing a driving operation for avoiding the risky object to a driver, and the fourth process is not performed when the driver has performed an action for reducing or releasing an operation of an operator instructing an accelerating operation for accelerating the mobile object.

(2) In the aspect of (1), the fourth process does not have to be performed when the driver has performed the action before the index value reaches a third threshold value greater than the second threshold value, and the fourth process may be performed when the index value has reached the third threshold value and the driver has performed none of the action, an action for decelerating the mobile object, and an action for causing the mobile object to avoid the risky object by operating an operator steering the mobile object before the index value reaches the third threshold value.

(3) In the aspect of (2), the proposal may continue to be delivered until the index value reaches the second threshold value when the driver has performed the action after having performed the fourth process.

(4) In the aspect of any one of (1) to (3), the operator may be an accelerator pedal, and the fourth process does not have to be performed when an amount of operation of the accelerator pedal becomes smaller by a predetermined value or more or an operation of the accelerator pedal stops.

(5) In the aspect of any one of (1) to (3), the fourth process may be one or more of: (1) a process of causing a display visible to the driver to display information indicating deceleration or a moving direction in which the mobile object travels to avoid the risky object; (2) a process of notifying the driver of a proposal for a driving operation by speech; (3) a process of operating the operator steering the mobile object in a direction in which the mobile object travels to avoid the risky object; and (4) a process of causing the operator steering the mobile object or a seat belt of the driver to vibrate.

(6) In the aspect of any one of (1) to (3), an information provision device may be controlled such that the driver is notified of information indicating that the risky object is present when it is estimated that the driver has not seen the risky object before the index value reaches a third threshold value greater than the second threshold value, and the fourth process may be performed when it is estimated that the driver has seen the risky object and the driver has not performed the action, an action for decelerating the mobile object, and an action for causing the mobile object to avoid the risky object by operating an operator steering the mobile object before the index value reaches the third threshold value greater than the second threshold value.

(7) In the aspect of any one of (1) to (3), the second process may be performed instead of the fourth process when the index value reaches the second threshold value after the fourth process has been performed, and the second process may include one or both of a process of giving a warning indicating that the mobile object has approached the risky object to the driver and a process of automatically decelerating the mobile object.

(8) In the aspect of (7), the first process may be performed instead of the second process when the index value reaches the first threshold value after the second process has been performed, and the first process may include one or both of a process of decelerating the mobile object at a deceleration higher than that at the time of deceleration in the second process and a process of automatically controlling steering of the mobile object such that the mobile object moves beside the risky object.

(9) According to another aspect of the present invention, there is provided a control method that is performed by a computer, the control method including: performing a first process when an index value indicating a degree of closeness to a risky object which is present in front of a mobile object is less than a first threshold value; performing a second process different from the first process when the index value is equal to or greater than the first threshold value and less than a second threshold value greater than the first threshold value; and performing a third process different from the first process and the second process when the index value is equal to or greater than the second threshold value, wherein the third process includes a fourth process of proposing a driving operation for avoiding the risky object to a driver, and the fourth process is not performed when the driver has performed an action for reducing or releasing an operation of an operator instructing an accelerating operation for accelerating the mobile object.

(10) According to another aspect of the present invention, a non-transitory storage medium is provided storing a program, the program causing a computer to perform: performing a first process when an index value indicating a degree of closeness to a risky object which is present in front of a mobile object is less than a first threshold value; performing a second process different from the first process when the index value is equal to or greater than the first threshold value and less than a second threshold value greater than the first threshold value; and performing a third process different from the first process and the second process when the index value is equal to or greater than the second threshold value, wherein the third process includes a fourth process of proposing a driving operation for avoiding the risky object to a driver, and the fourth process is not performed when the driver has performed an action for reducing or releasing an operation of an operator instructing an accelerating operation for accelerating the mobile object.

According to the aspects of (1) to (10), since the control device does not propose a driving operation for avoiding a risky object to a driver when the index value is equal to or greater than the second threshold value and the driver has performed the action for reducing or releasing an operation of the operator for instructing an accelerating operation for accelerating a mobile object, it is possible to provide information in which the driver's intention is reflected.

DETAILED DESCRIPTION

Hereinafter, a control device, a control method, and a storage medium according to an embodiment of the present invention will be described with reference to the accompanying drawings. In the following description, a mobile object is assumed to be a vehicle, but a mobile object may be an object other than a vehicle.

First Embodiment

Entire Configuration

Figure 1:
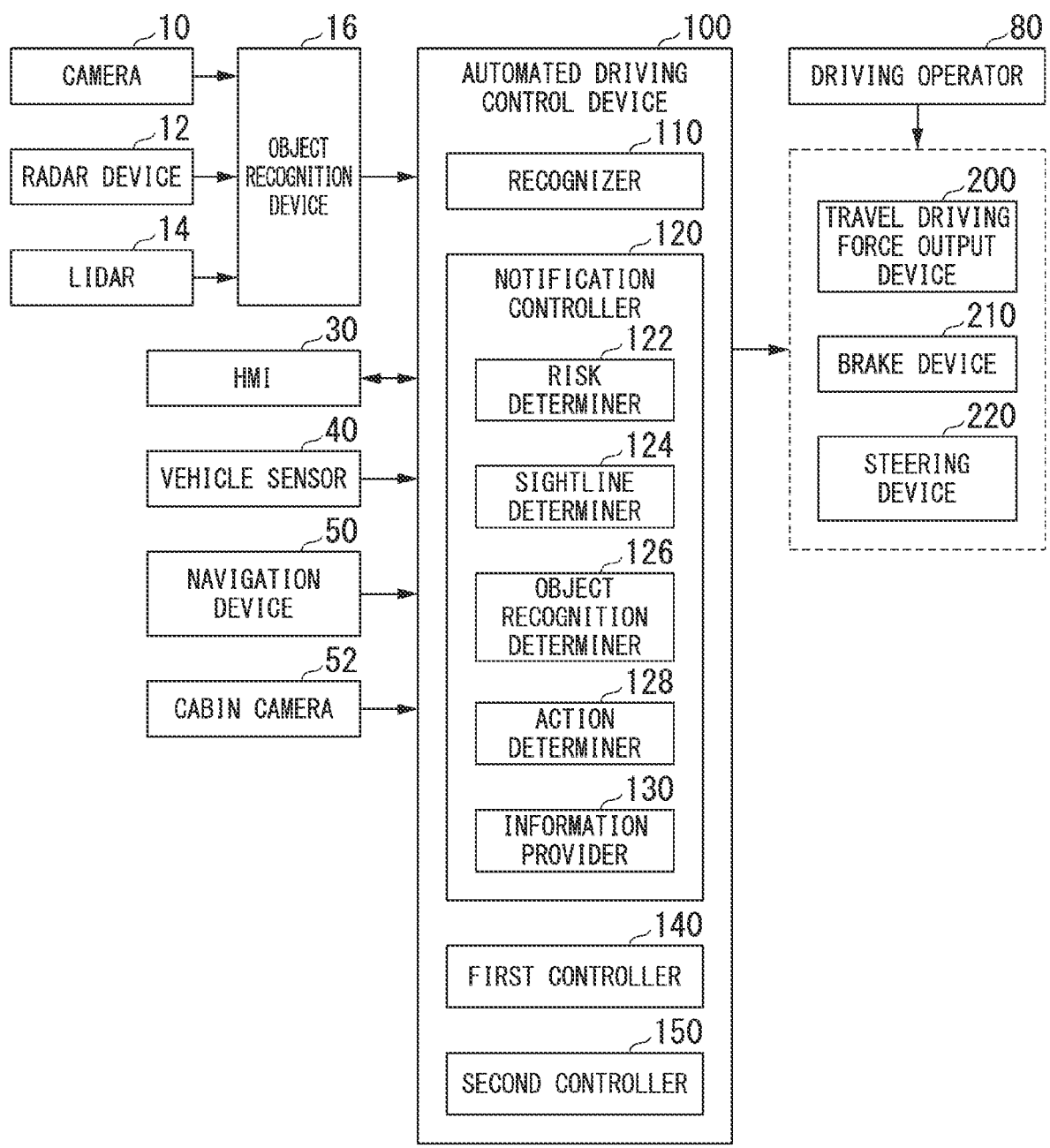
FIG. 1 is a diagram showing a configuration of a vehicle M in which a driving support device according to an embodiment is mounted.

FIG. 1 is a diagram showing a configuration of a vehicle M in which a driving support device 100 according to an embodiment is mounted. A vehicle M is, for example, a vehicle with two wheels, three wheels, or four wheels, and a drive source thereof is an internal combustion engine such as a diesel engine or a gasoline engine, an electric motor, or a combination thereof. The electric motor operates using electric power generated by a power generator connected to the internal combustion engine or electric power discharged from a secondary battery or a fuel cell.

For example, a camera 10, a radar device 12, a Light Detection and Ranging (LIDAR) 14, an object recognition device 16, a human-machine interface (HMI) 30, a vehicle sensor 40, a cabin camera 52, a driving operator 80, a driving support device 100, a travel driving force output device 200, a brake device 210, and a steering device 220 are mounted in the vehicle M. These devices or instruments are connected to each other via a multiplex communication line such as a controller area network (CAN) communication line, a serial communication line, a radio communication network, or the like. The configuration shown in FIG. 1 is only an example, and part of the configuration may be omitted or another configuration may be added thereto.

The camera 10 is, for example, a digital camera using a solid-state imaging device such as a charge coupled device (CCD) or a complementary metal oxide semiconductor (CMOS). The camera 10 is attached to an arbitrary position on a vehicle (hereinafter referred to as a vehicle M) in which a vehicle system 1 is mounted. The camera 10 includes, for example, a camera imaging a front view, a camera imaging a left-front view, a camera imaging a right-front view, a camera imaging a left-rear view, and a camera imaging a right-rear view. For example, the camera 10 imaging a front view is attached to an upper part of a front windshield, a rear surface of a rearview mirror, or the like. For example, the camera imaging a left-front view is attached to a left A pillar, the vicinity of the A pillar, the vicinity of a left sideview mirror, or the like, the camera imaging a right-front view is attached to a right A pillar, the vicinity of the A pillar, the vicinity of a right sideview mirror, or the like, the camera imaging a left-rear view is attached to a left C pillar, the vicinity of the C pillar, or the like, and the camera imaging a right-rear view is attached to a right C pillar, the vicinity of the C pillar, or the like. The positions to which these cameras are attached are not particularly limited as long as the cameras can image corresponding imaging areas. The camera 10 images the surroundings of the vehicle M, for example, periodically and repeatedly. The camera 10 may be a stereoscopic camera.

The radar device 12 detects at least a position (a distance and a direction) of an object by radiating radio waves such as millimeter waves to the surroundings of the vehicle M and detecting radio waves (reflected waves) reflected by the object. The radar device 12 is attached to an arbitrary position on the vehicle M. The radar device 12 may detect a position and a speed of an object using a frequency modulated continuous wave (FM-CW) method. The radar device 12 may be attached to, for example, the vicinities of the positions to which the cameras are attached. For example, the camera 10 and the radar device 12 may be attached as a pair.

The LIDAR device 14 radiates light (or electromagnetic waves of wavelengths close to light) to the surroundings of the vehicle M and measures scattered light. The LIDAR device 14 detects a distance to an object on the basis of a time period from radiation of light to reception of light. The radiated light is, for example, a pulse-like laser beam. The LIDAR device 14 is attached to an arbitrary position on the vehicle M.

The object recognition device 16 performs a sensor fusion process on results of detection from some or all of the camera 10, the radar device 12, and the LIDAR device 14 and recognizes a position, a type, a speed, and the like of an object. The object recognition device 16 outputs the result of recognition to the driving support device 100. The object recognition device 16 may output the results of detection from the camera 10, the radar device 12, and the LIDAR device 14 to the driving support device 100 without any change. The object recognition device 16 may be omitted from the vehicle system 1. Some or all of the camera 10, the radar device 12, the LIDAR device 14, and object recognition device 16 are examples of a "detection device."

The HMI 30 presents various types of information to an occupant of the vehicle M and receives an input operation from the occupant. The HMI 30 includes various types of display devices, a speaker, a buzzer, a vibration generator (a vibrator), a touch panel, a switch, and keys. The vibration generator causes a seat belt of a driver's seat to vibrate or causes a steering wheel to vibrate, for example, under the control of the driving support device 100. The HMI is an example of an "information provision device".

The vehicle sensor 40 includes a vehicle speed sensor detecting a speed of the vehicle M, an acceleration sensor detecting an acceleration, a yaw rate sensor detecting an angular velocity around a vertical axis, and a direction sensor detecting a direction of the vehicle M.

A navigation device 50 includes, for example, a global navigation satellite system (GNSS) receiver, a guidance controller, and a storage storing map information. The GNSS receiver identifies a position of the vehicle M on the basis of signals received from GNSS satellites. The position of the vehicle M may be identified or complemented by an inertial navigation system (INS) using the output of the vehicle sensor 40. For example, the guidance controller determines a route from the position of the vehicle M identified by the GNSS receiver (or an input arbitrary position) to a destination input by an occupant with reference to the map information and causes the HMI 30 to output guidance information such that the vehicle M travels along the route. The map information is, for example, information in which a road shape is expressed by links indicating a road and nodes connected by the inks. The map information may include a curvature of a road and point of interest (POI) information. The navigation device 50 may transmit a current position and a destination of the vehicle M to a navigation server via a communication device and acquire a route from the navigation server.

The cabin camera 52 is, for example, a digital camera using a solid-state imaging device such as a CCD or a CMOS. The cabin camera 52 is attached to a position on the vehicle M at which an occupant (for example, a driver sitting on a driver's seat) of the vehicle M can be imaged. For example, the cabin camera 52 images an imaging area with a predetermined period.

The driving operator 80 includes, for example, an accelerator pedal, a brake pedal, a steering wheel, a shift lever, and other operators. A sensor detecting an amount of operation or whether an operation has been performed is attached to the driving operator 80. Results of detection from the sensor are output to some or all of the travel driving force output device 200, the brake device 210, and the steering device 220.

The travel driving force output device 200 outputs a travel driving force (a torque) for allowing the vehicle to travel to driving wheels. The travel driving force output device 200 includes, for example, a combination of an internal combustion engine, an electric motor, and a transmission and an electronic control unit (ECU) that controls them. The ECU controls the elements on the basis of information input from the driving support device 100 or information input from the driving operator 80.

The brake device 210 includes, for example, a brake caliper, a cylinder that transmits a hydraulic pressure to the brake caliper, an electric motor that generates a hydraulic pressure in the cylinder, and an ECU. The ECU controls the electric motor on the basis of the information input from the driving support device 100 or the information input from the driving operator 80 such that a brake torque based on a braking operation is output to vehicle wheels. The brake device 210 may include a mechanism for transmitting a hydraulic pressure generated by an operation on the brake pedal included in the driving operator 80 to the cylinder via a master cylinder as a backup. The brake device 210 is not limited to the above-mentioned configuration, and may be an electronically controlled hydraulic brake device that controls an actuator on the basis of the information input from the driving support device 100 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the driving support device 100 or the information input from the driving operator 80 to change the direction of the turning wheels. For example, the steering device 220 or the steering wheel may serve as an "information provision device" that notifies or informs the driver of information. For example, when avoidance of a risky object which will be described later is proposed to a user by rotating the steering wheel or temporarily fixing the steering wheel to a position to which the steering wheel rotates by a predetermined angle, the steering device or the steering wheel serves as an "information provision device".

Driving Support Device

The driving support device 100 includes, for example, a recognizer 110, a notification controller 120, a first controller 140, and a second controller 150. The notification controller 120 includes, for example, a risk determiner 122, a sightline determiner 124, an object recognition determiner 126, an action determiner 128, and an information provider 130. These functional units are realized, for example, by causing a hardware processor such as a central processing unit (CPU) to execute a program (software). Some or all of such elements may be realized by hardware (a circuit part including circuitry) such as a large scale integration (LSI) device, an application-specific integrated circuit (ASIC), or a field-programmable gate array (FPGA), or a graphics processing unit (GPU) or may be cooperatively realized by software and hardware. The program may be stored in a storage device (a storage device including a non-transitory storage medium) such as an HDD or a flash memory of the driving support device 100 in advance or may be stored in a removable storage medium such as a DVD or a CD-ROM and installed in the HDD or the flash memory of the driving support device 100 by attaching the removable storage medium (a non-transitory storage medium) to a drive device.

Settings in the travel driving force output device 200, the brake device 210, and the steering device 220 are performed such that instructions for the travel driving force output device 200, the brake device 210, and the steering device 220 from the driving support device 100 are executed with higher priority than the results of detection from the driving operator 80. When a braking force based on an amount of operation on the brake pedal is greater than an instruction from the driving support device 100, braking may be set such that the former is preferentially executed. As a structure for preferentially executing the instruction from the driving support device 100, a communication priority in an onboard LAN may be used.

Process when Risky Object is Present

When a risky object is present in front of the vehicle M, the driving support device 100 performs various types of processes on the basis of an index value indicating a degree of closeness of the vehicle M to the risky object and threshold values.

The "degree of closeness" is expressed by various index values indicating a degree of closeness between objects. For example, the "degree of closeness" is a time-to-collision (TTC) which is an index value calculated by dividing a distance by a relative speed (a direction in which the objects approach each other is defined as positive). When the relative speed is negative (a direction in which the objects are separated from each other), the TTC is set to the infinite. The TTC is an index value indicating that the "degree of closeness" is higher as the value thereof becomes lower. When a "first condition" is satisfied, it means, for example, that the TTC is less than a first threshold value Th1. The first threshold value Th1 is, for example, about 1 comma number [sec]. Instead of the TTC, an index value having the same characteristics such as vehicle time headway (THW) or another index value may be used as the "degree of closeness." A TTC adjusted in consideration of acceleration or jerk may be used as the "degree of closeness." In the following description, the "degree of closeness" is assumed to be the TTC.

A risky object is, for example, an object which is to be avoided by the vehicle M. Examples of the risky object include an object interfering with the vehicle M when the vehicle moves in a current state and an object with a likelihood of interference. The object with a likelihood of interference is, for example, an object of which a degree of closeness after a predetermined time period is equal to or greater than a predetermined degree in consideration of a position, a moving direction, and a moving speed of the object and a position, a moving method, and a moving speed of the vehicle M. The object may be a traffic participant such as a pedestrian, a bicycle, or a vehicle or an object other than a traffic participant, such as an object placed on a road or a fallen object.

The recognizer 110 recognizes a risky object near the vehicle M on the basis of the information input from the object recognition device 16. Recognition means, for example, that a risky object classified as described above is present and thus a relative position of the risky object with respect to the vehicle M is recognized. For example, the recognizer 110 tracks the recognized object.

The risk determiner 122 determines a direction in which there is a risk, for example, on the basis of the position of the risky object. For example, the risk determiner 122 determines that a risk is present in front of the vehicle M when a risky object is present in front of the vehicle M.

For example, the sightline determiner 124 analyses an image captured by the cabin camera 52 and determines a direction of a driver's face or a direction of a driver's sightline on the basis of the result of analysis.

The object recognition determiner 126 determines (or estimates) whether the driver has seen the risky object. For example, information indicating a correlation between a driver's sightline direction (an effective field of view in the sightline direction) in an image and a position of an object with respect to the vehicle M is stored in the storage device of the driving support device 100 in advance. The object recognition determiner 126 determines whether the determined sightline direction in the image matches a direction of a position of a risky object with reference to the information indicating the correlation, determines that the driver sees the risky object when both match, and determines that the driver does not see the risky object when both do not match. Instead of the aforementioned process, whether the driver has seen the risky object may be determined using a predetermined algorithm.

The action determiner 128 determines an action of the driver. The action is, for example, an operation state of the accelerator pedal, an operation state of the steering wheel, or an operation state of the brake pedal. The action determiner 128 determines the action of the driver, for example, on the basis of results of detection from a sensor detecting amounts of operation of the accelerator pedal, the brake pedal, and the steering wheel or whether an operation is performed.

The information provider 130 provides information on the basis of the determination result from the object recognition determiner 126, or the determination result from the action determiner 128. Details thereof will be described later.

Notification Timing

Figure 2:
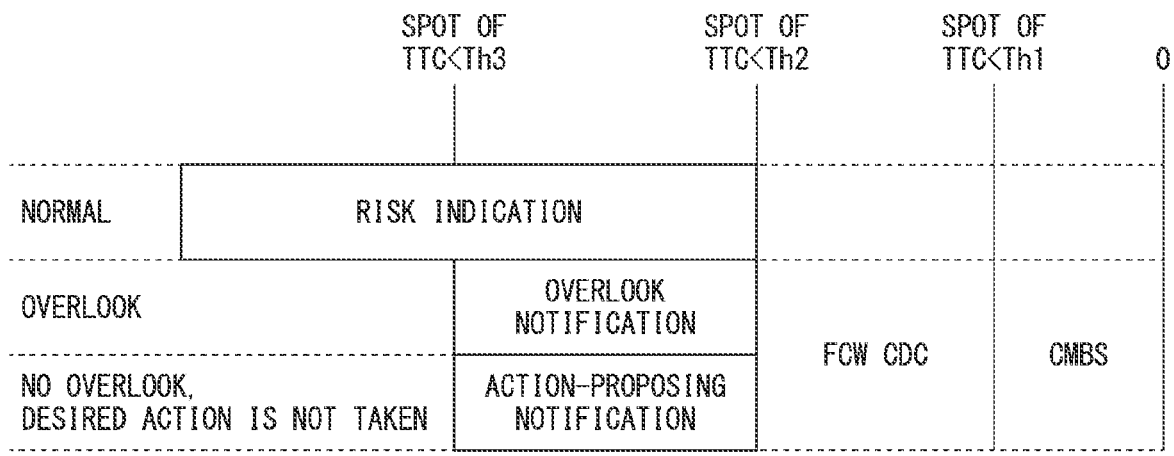
FIG. 2 is a diagram showing a notification timing when a risky object is present.
Figure 3:
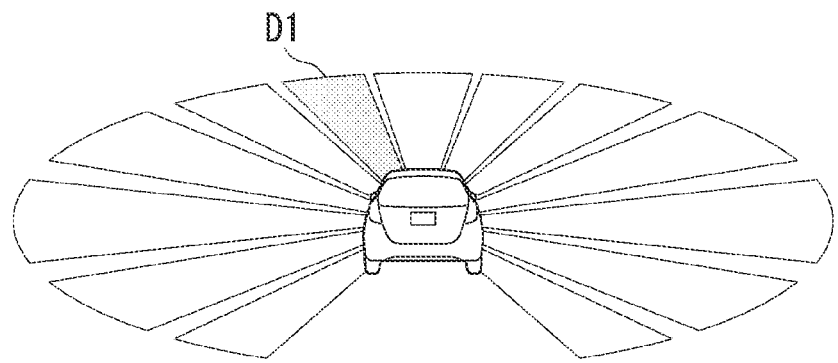
FIG. 3 is a diagram showing an example of a risk indication.

FIG. 2 is a diagram showing a notification timing at which a risky object is present. When a risky object is present, the information provider 130 displays a risk indication indicating a direction in which the risky object is present on a display. FIG. 3 is a diagram showing an example of a risk indication. For example, as shown in FIG. 3, contents with which a direction (D1 in the drawing) in which a risky object is present with respect to the vehicle M can be recognized are displayed. The information provider 130 provides the risk indication to the driver, for example, until the TTC reaches a second threshold value Th2. The second threshold value Th2 is, for example, about 3 [sec] or less or greater than about 3 [sec]. The risk indication, an overlook notification which will be described later, and an action-proposing notification which will be described later are an example of a "third process."

Figure 4:
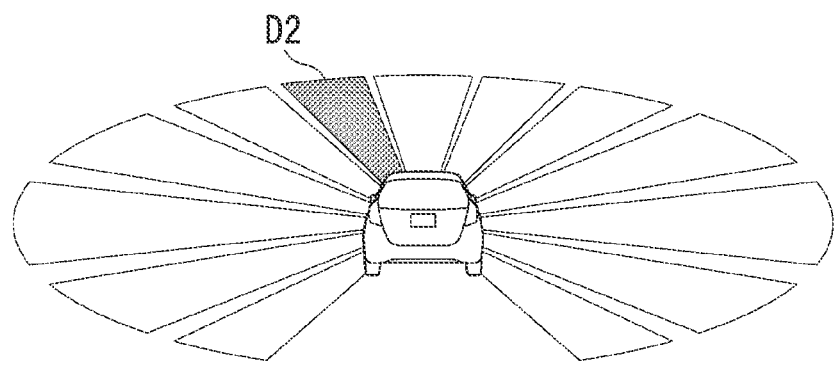
FIG. 4 is a diagram showing an example of overlook notification.

The information provider 130 provides an overlook notification when the driver does not see a risky object until the TTC reaches a third threshold value Th3. The overlook notification is a notification for notifying that the driver is not seeing the risky object. FIG. 4 is a diagram showing an example of an overlook notification. For example, as shown in FIG. 4, contents with which a direction (D2 in the drawing) in which a risky object is present with respect to the vehicle M can be recognized are displayed. For example, a direction in which the risky object is present is notified in a more emphasized mode than the mode shown in FIG. 3. The emphasized mode may be, for example, a mode in which the driver becomes more likely to face a direction in which a more risky object is present such as emphasis by a color or emphasis by flicking or turning on an icon or the like. For example, the information provider 130 provides an overlook notification to the driver from when the TTC has reached the third threshold value Th3 to when the TTC has reached the second threshold value Th2. For example, the overlook notification is continuously provided even if a risky object is seen when the TTC is between the third threshold value Th3 and the second threshold value Th2. The third threshold value Th3 is, for example, about 4 [sec] or less or greater than about 4 [sec].

The information provider 130 provides an action-proposing notification (a fourth process) when the driver sees a risky object (when it is estimated that the driver has seen a risky object) and the driver does not perform a predetermined action until the TTC reaches the third threshold value Th3. The action-proposing notification is a notification for proposing that the driver perform an action to avoiding the risky object. The information provider 130 provides the action-proposing notification to the driver, for example, from a time point at which the TTC reaches the third threshold value Th3 to a time point at which the TTC reaches the second threshold value Th2. For example, the action-proposing notification is continuously provided even if the driver performs an action based on the action-proposing notification when the TTC is between the third threshold value Th3 and the second threshold value Th2.

The predetermined action is, for example, an action corresponding to deceleration or turning. The predetermined action means, for example, that the brake pedal is operated or that the steering wheel (an operator for performing steering) is operated in the direction in which a risky object is avoided. The predetermined action means that an amount of operation on the accelerator pedal is less by a predetermined value than the amount of operation before a predetermined time or that an operation on the accelerator pedal is released. Release means that the driver stops the operation on the accelerator pedal such that the amount of operation is zero or close to zero.

Figure 5:
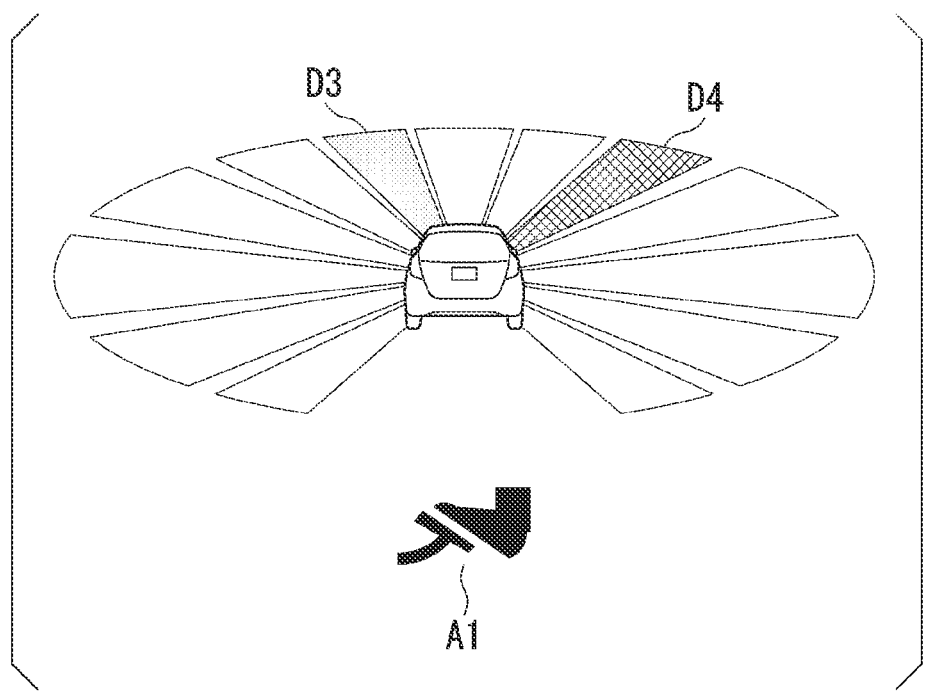
FIG. 5 is a diagram showing an example of action-proposing notification.

FIG. 5 is a diagram showing an example of the action-proposing notification. For example, as shown in FIG. 5, contents with which a direction (D3 in the drawing) in which a risky object is present with respect to the vehicle M can be recognized as shown in FIG. 3 (or FIG. 4) are displayed. As shown in FIG. 5, contents with which a direction (D4 in the drawing) in which the vehicle M travels to avoid the risky object can be recognized by the driver are displayed. The contents include information indicating an action to be performed by the driver as the action-proposing notification. In FIG. 5, an icon (A1 in the drawing) for prompting the driver to operate the brake pedal to decelerate the vehicle is displayed.

The action-proposing notification may not be an indication, but may be a notification based on speech, voice, sound, a notification (a notification based on fixing the steering wheel to a position at which the steering wheel rotates by a predetermined angle in a direction parallel to the traveling direction or a notification based on rotating the steering wheel by a predetermined angle or returning the steering wheel to the original position) based on the driver's recognizing a traveling direction by automatically steering the steering wheel in a progress direction, a notification by strengthening a binding force of a seat belt by controlling a pre-tensioner mechanism of the driver's seat belt, or a notification by causing the seat belt to vibrate. The information provider 130 provides an action-proposing notification to the driver, for example, from a time point at which the TTC reaches the third threshold value Th3 to a time point at which the TTC reaches the second threshold value Th2.

Here, the predetermined action means that an amount of operation on the accelerator pedal is less by a predetermined value than the amount of operation before a predetermined time or that an operation on the accelerator pedal is released. The driver tends to perform an action for avoidance after decreasing the amount of operation on the accelerator pedal or stopping the operation on the accelerator pedal when the driver does not perform an action for controlling deceleration or steering, recognizes a risky object, and avoids the risky object. This tendency has been found by analyzing various results of experiment, simulation, or the like. In this way, the information provider 130 can provide information in which the driver's intention is more reflected by determining whether the action-proposing notification is to be provided on the basis of whether the predetermined action has been performed.

In the aforementioned example, when the driver sees the risky object while the overlook notification is being performed, the overlook notification may be stopped even before the TTC has not reached the second threshold value Th2. In the example, when the driver has performed an action based on proposal or a predetermined action while the action-proposing notification is being performed, the action-proposing notification may be stopped even before the TTC reaches the second threshold value Th2.

In the example, when an event in which a risky object is present occurs while the TTC is between the third threshold value Th3 and the second threshold value Th2 (for example, when a pedestrian has popped out), the information provider 130 provides a notification along with a risky indication on the basis of the driver's action at that time. For example, the information provider 130 provides the overlook notification when the driver does not see the risky object and provides the action-proposing notification when the driver sees the risky object and performs the predetermined action.

Specific Example 1

Figure 6:
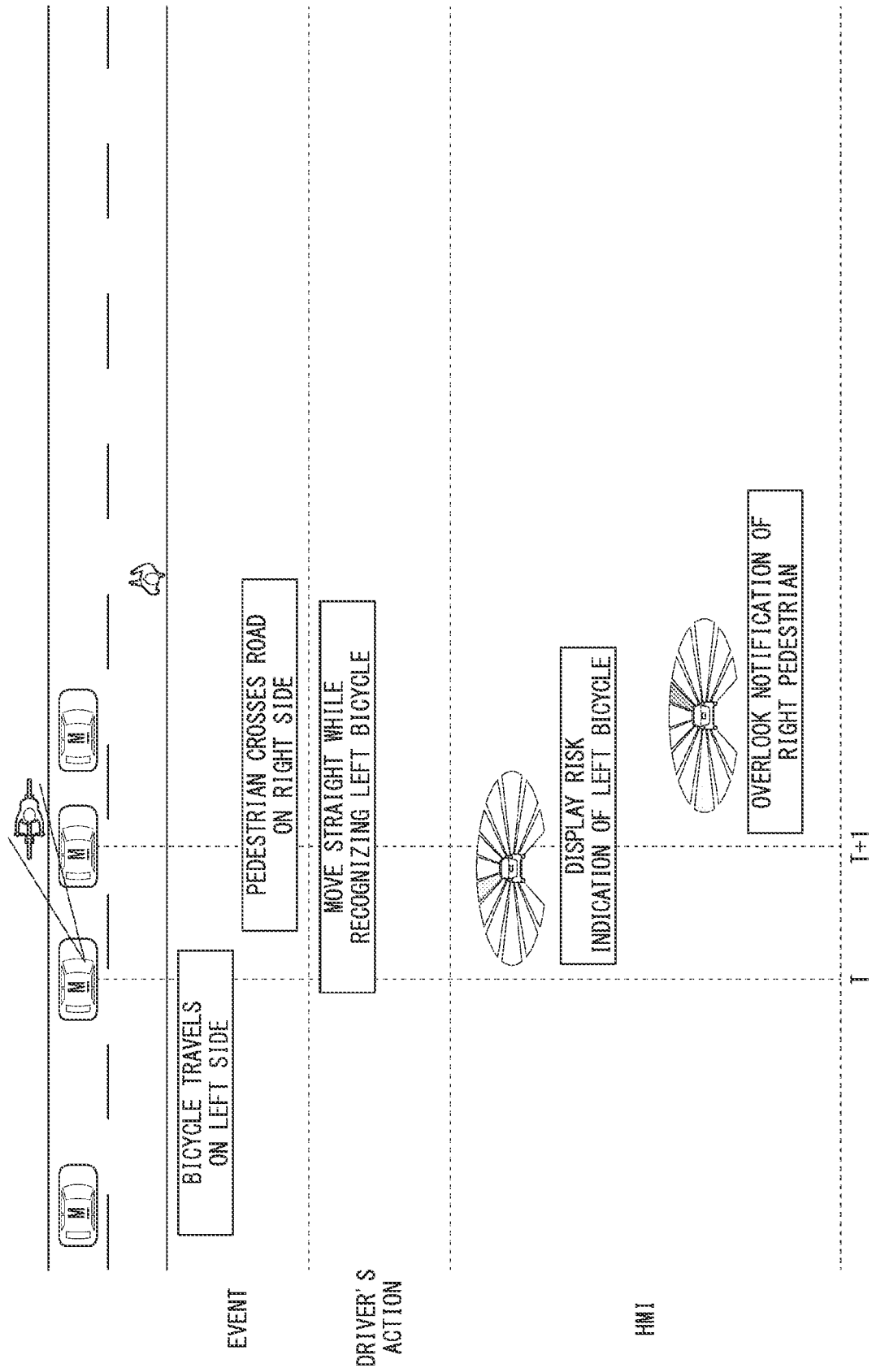
FIG. 6 is a diagram showing an example of a relationship between an event, a driver's action, and information provided by an HMI.

FIG. 6 is a diagram showing an example of a relationship between an event, a driver's action, and information provided in the HMI. It is assumed that the vehicle M travels straight on a road. At this time, it is assumed that a bicycle travels on the left side of the vehicle M. At time T, the driver of the vehicle M sees the bicycle and the driver causes the vehicle M to travel straight while recognizing the bicycle. In this case, the information provider 130 displays a risk indication indicating the direction of the bicycle with respect to the vehicle M on the display. Thereafter, at time T+1, it is assumed that a pedestrian being going to cross a road on the right side of the vehicle M appears. At this time, when the driver does not see the pedestrian, the information provider 130 displays an overlook notification for the pedestrian on the display.

As described above, the information provider 130 notifies the driver of appropriate information on the basis of the driver's degree of recognition of the surroundings. Accordingly, the driver can control the vehicle M such that the vehicle M avoids the risky object with time to spare.

Specific Example 2

Figure 7:
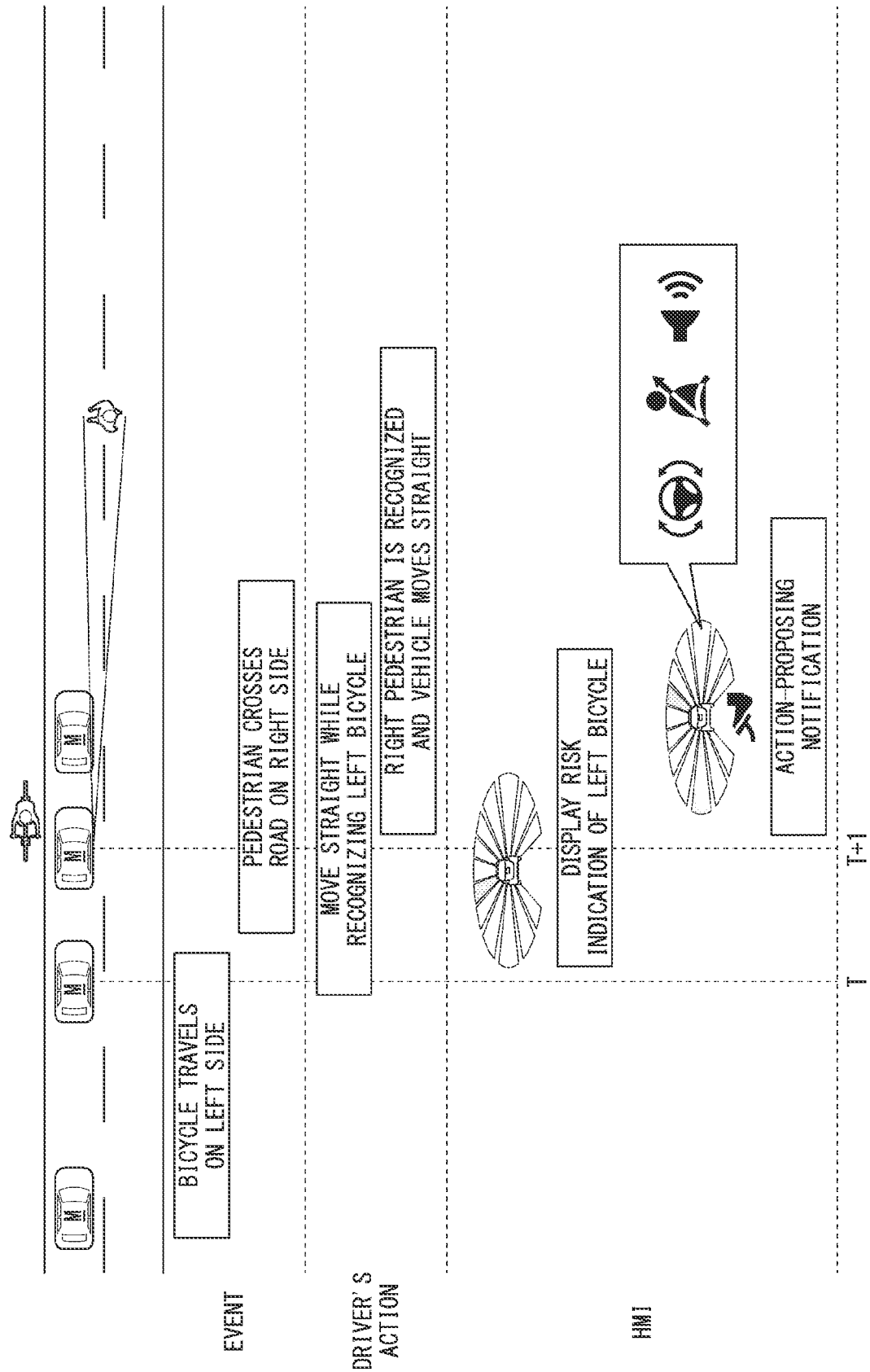
FIG. 7 is a diagram showing another example of a relationship between an event, a driver's action, and information provided by an HMI.

FIG. 7 is a diagram showing another example of a relationship between an event, a driver's action, and information provided in the HMI. Differences from those shown in FIG. 6 will be mainly described below. At time T+1, it is assumed that a pedestrian being going to cross a road on the right side of the vehicle M appears. At this time, when the driver does not see the pedestrian and does not perform a predetermined action, the information provider 130 provides an action-proposing notification.

As described above, the information provider 130 notifies the driver of appropriate information on the basis of the driver's degree of recognition of the surroundings and the driver's action. Accordingly, the driver can control the vehicle M such that the vehicle M avoids the risky object with time to spare.

Flowchart

Figure 8:
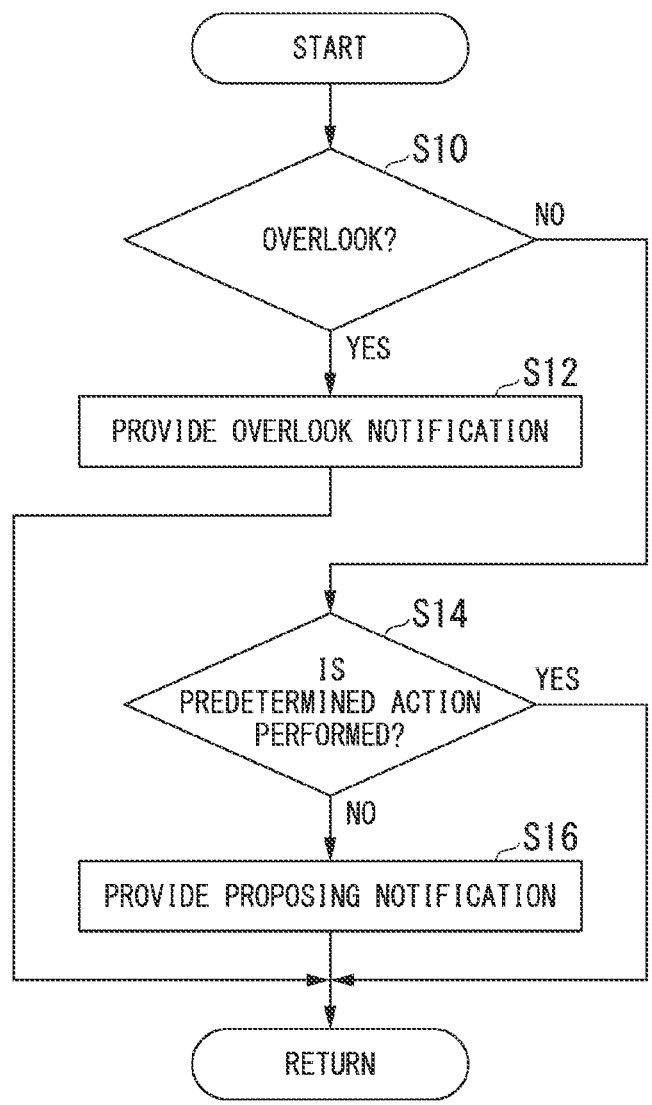
FIG. 8 is a flowchart showing an example of a routine that is performed by a notification controller.

FIG. 8 is a flowchart showing an example of a routine which is performed by the notification controller 120. In this routine, it is assumed that a risky object is present at a predetermined distance in front of the vehicle M. First, the notification controller 120 determines whether the driver overlooks the risky object (Step S10). When the driver overlooks the risky object (when the driver does not see the risky object), the notification controller 120 performs an overlook notification (Step S12).

When the driver does not overlook the risky object (when the driver sees the risky object), the notification controller 120 determines whether the driver is performing a predetermined action (Step S14). When the driver is performing a predetermined action, this routine ends. In this case, for example, a risky indication indicating a direction of a position of the risky object with respect to the vehicle M is displayed on the display.

When the driver does not perform the predetermined action, the notification controller 120 provides an action-proposing notification (Step S16). Thereafter, this routine ends.

As described above, the notification controller 120 can notify the driver of appropriate information on the basis of the driver's degree of recognition of the surroundings and the driver's action. For example, when the driver is performing the predetermined action, the notification controller 120 does not provide an action-proposing notification and thus it is possible to reduce inconvenience to the driver. Particularly, when the driver's amount of operation on the accelerator pedal decreases or the driver stops the operation on the accelerator pedal, the driver is estimated to perform an action for avoiding a risky object and thus the notification controller 120 curbs notifying the driver. As a result, the notification controller 120 can provide information in which the driver's intention is reflected.

In the example, the overlook notification or the action-proposing notification is displayed, but the overlook notification and the action-proposing notification may be simultaneously displayed. For example, information indicating that deceleration is to be performed may be notified using the overlook notification or the steering wheel may rotate or vibrate automatically such that the driver recognizes a direction in which the risky object is avoided.

One or both of the overlook notification and the action-proposing notification may be omitted. For example, the overlook notification may not be performed when the driver overlooks the risky object. The action-proposing notification may also be performed when the driver overlooks the risky object.

Braking Control

Figure 9:
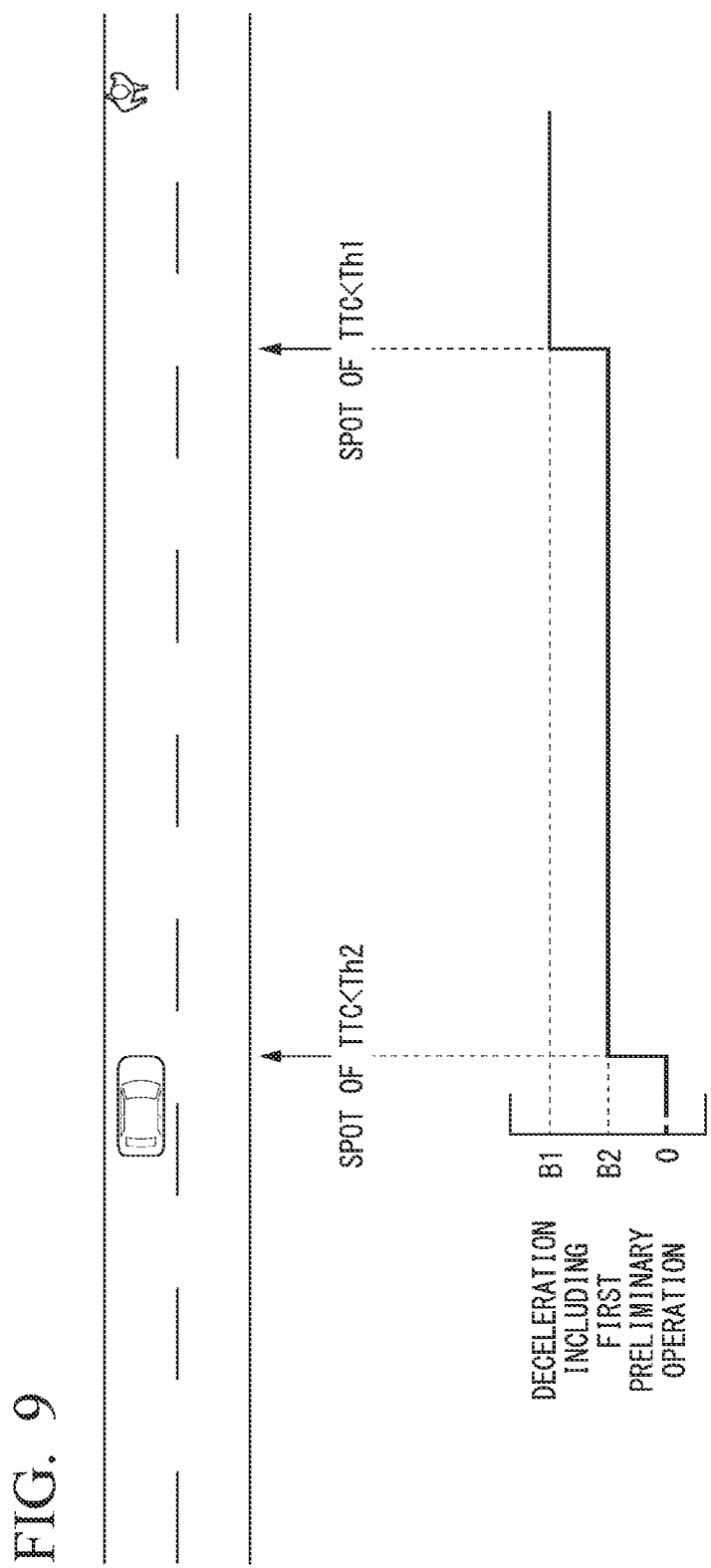
FIG. 9 is a diagram showing braking control.

Routines when the TTC is less than the second threshold value Th2 and when the TTC is less than the first threshold value Th1 will be described below with reference to FIG. 9. FIG. 9 is a diagram showing braking control.

When a degree of closeness between a risky object and the vehicle M satisfies a predetermined condition (for example, when the TTC is less than the second threshold value Th2), the first controller 140 performs a first action for notifying a driver of the vehicle M that the risky object is present. The first action is, for example, an action for instructing the brake device 210 and/or the travel driving force output device 200 to output a braking force for decelerating the vehicle M at a second deceleration B2 from a time point at which the TTC becomes less than the second threshold value Th2 to a time point at which the TTC becomes less than the first threshold value Th1. The second deceleration B2 is a deceleration less than a first deceleration B1 (close to zero). The second threshold value Th2 is greater than the first threshold value Th1. The first action is so-called CDC control. At this time, a warning (FCW) indicating that the vehicle becomes close to the risky object in front may be output. Deceleration using the braking force may be performed when the warning (FCW) has been output for a predetermined time.

The second controller 150 performs a second action when the TTC is less than the first threshold value Th1. The second action is an action for controlling the vehicle M such that the vehicle M does not collide with the risky object (a collision mitigation braking system (CMBS)). For example, the second controller 150 instructs the brake device 210 and/or the travel driving force output device 200 to output a braking force for decelerating the vehicle M at the first deceleration B1. The first deceleration B1 is, for example, a deceleration of about 0 comma number [G] (close to 1). Accordingly, the second controller 150 rapidly decelerates and stops the vehicle M to avoid collision with the risky object. Functions of calculating a brake output, a regenerative control quantity, an engine brake quantity, and the like from the instructed deceleration are provided in the ECU of the brake device 210 or the travel driving force output device 200, and the ECU determines the control quantities on the basis of the instructed deceleration and the speed of the vehicle M. This technique is known and thus detailed description thereof will be omitted.

For example, the second controller 150 may determine whether an object is present in a lateral area extending from slightly before the risky object to the rear side of the vehicle and cause the vehicle M to travel in a traveling lane beside the risky object and to avoid the risky object when no object is present in the lateral area. For example, when it is difficult to avoid the risky object using the braking force, the second controller 150 may cause the vehicle to travel in a lateral traveling lane.

In the example, when the TTC is less than the second threshold value Th2 or less than the first threshold value Th1, the CDC or the CMBS is performed, but a traffic sign detecting function (TSR), a traffic signal detecting function (TLI), a function of detecting or notifying of a vehicle approaching the vehicle M from the right or left side thereof, an automatic steering avoiding function, an emergency braking system, or the like may be started to perform various types of control instead (or in addition) thereof. For example, the traffic sign detecting function (TSR), the traffic signal detecting function (TLI), or the function of detecting or notifying of a vehicle approaching the vehicle M from the right or left side thereof may be started when the vehicle M passes through a crossing, or the automatic steering avoiding function may be started when the vehicle M approaches a pedestrian.

Notification According to Road Structure

Figure 10:
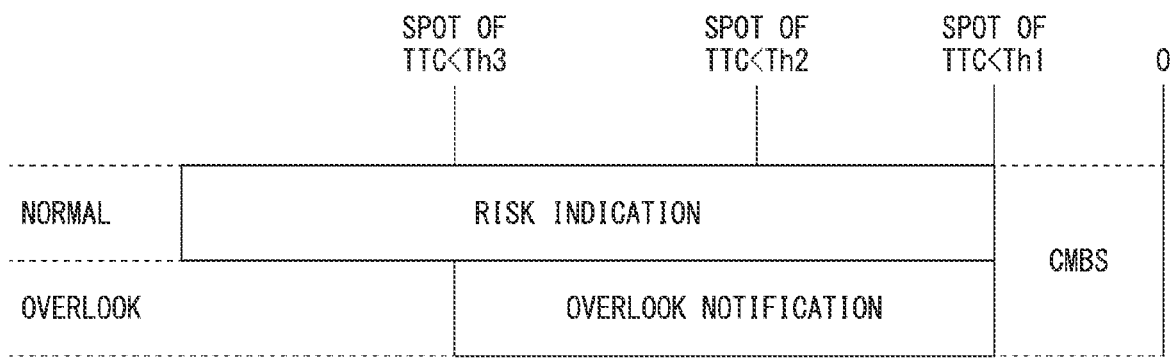
FIG. 10 is a diagram showing another example of a notification mode.

The notification controller 120 may skip causing the vehicle M to provide an action-proposing notification according to a road structure. FIG. 10 is a diagram showing another example of the notification mode. For example, when the vehicle M enters a crossing and is going to turn right or turn left and a risky object is a specific type such as a pedestrian, proposing notification may be omitted. In this case, the warning (FCW) and the CDC control may be omitted and the overlook notification may be performed until the TTC reaches the first threshold value Th1. This is because it is difficult to predict movement of a pedestrian in the crossing and an action cannot be easily proposed.

As described above, the notification controller 120 can notify of appropriate information on the basis of the driver's degree of recognition of the surroundings and the driver's action. As a result, the notification controller 120 can provide information in which the driver's intention is reflected.

The threshold values Th1 to Th3 may be changed according to the speed of the vehicle M and performance or specifications of various devices for recognizing a risky object (specifications or functions of the camera 10, the radar device 12, the LIDAR device 14, the object recognition device 16, the recognizer 110, or the like). For example, various devices may be set on the basis of a distance at which an object is recognizable.

According to the first embodiment, the driving support device 100 can provide information in which a driver's intention can be reflected by performing the process of proposing a driving operation for avoiding a risky object when the index value is equal to or greater than the second threshold value Th2 and not performing the process when the driver performs an action for reducing or releasing an operation of the operator instructing an accelerating operation of the vehicle M.

Second Embodiment

A second embodiment will be described below. In the second embodiment, a driving support device determines whether an action-proposing notification is to be provided on the basis of a determination as to whether or not a road shape is one for which an action-proposing notification is to be provided. For example, the driving support device 100 curbs provision of the action-proposing notification when a condition for providing the action-proposing notification is satisfied and the road shape is not a shape for which the action-proposing notification is to be provided. For example, the driving support device 100 curbs provision of the action-proposing notification when a reference position of the vehicle M (an arbitrary position such as a tip or the center of gravity of the vehicle) crosses a traveling road boundary (or when the reference position is present at a position different from the traveling road on which the vehicle M can travel) on the basis of the assumption that the vehicle M travels straight in the current traveling direction from the current position of the vehicle M, and provides the action-proposing notification when the reference position does not cross the traveling lane boundary (for example, does not curb but perform provision of the action-proposing notification). The traveling road on which a vehicle can travel is a lane or a road in which the vehicle M travels.

Curbing means, for example, that notification is not performed. Curbing may mean, for example, that an action-proposing notification mode is made to be weaker than the action-proposing notification mode which is performed when the road shape is a shape for which an action-proposing notification is to be provided. For example, the action-proposing notification mode which is not curbed is a mode in which an action-proposing notification can be more easily recognized by a driver than the action-proposing notification mode which is curbed.

Figure 11:
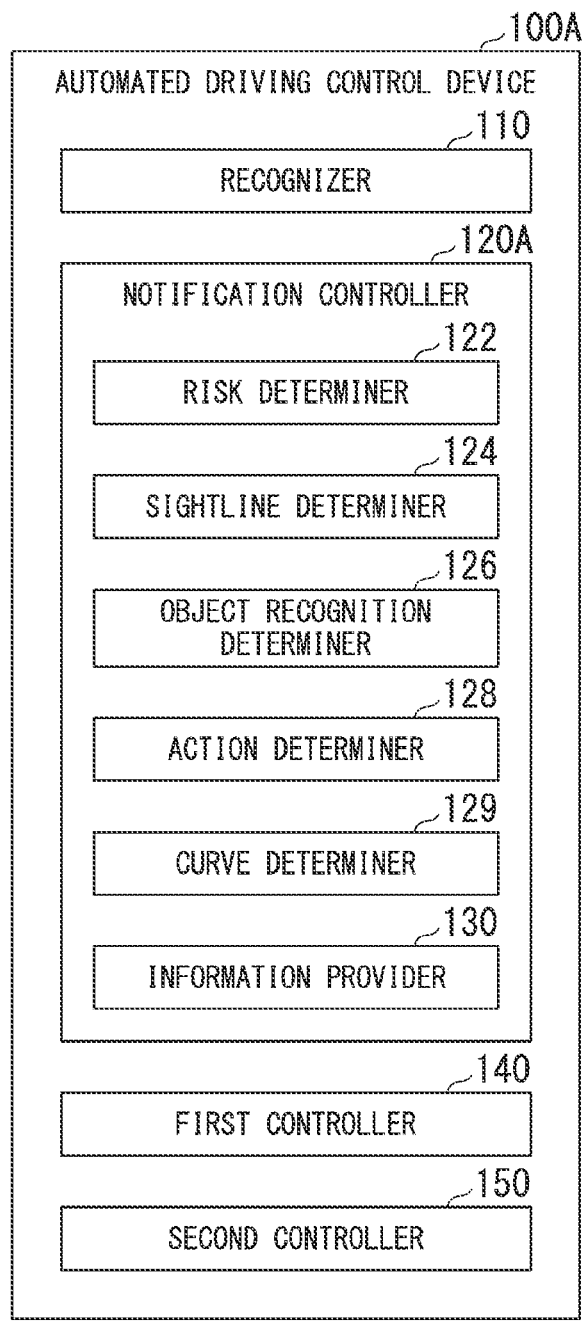
FIG. 11 is a diagram showing an example of a functional configuration of a driving support device according to a second embodiment.

FIG. 11 is a diagram showing an example of a functional configuration of a driving support device 100A according to the second embodiment. Differences from the driving support device 100 will be mainly described below. A notification controller 120A of the driving support device 100A includes, for example, a curve determiner 129 (a "determiner") in addition to the functional configuration included in the notification controller 120A of the driving support device 100. The curve determiner 129 is realized, for example, by causing a hardware processor such as a CPU to execute a program (software). The curve determiner 129 may be realized by hardware (a circuit part including circuitry) such as an LSI device, an ASIC, or an FPGA, or a GPU or may be cooperatively realized by software and hardware. The program may be stored in a storage device (a storage device including a non-transitory storage medium) such as an HDD or a flash memory of the driving support device 100A in advance or may be stored in a removable storage medium such as a DVD or a CD-ROM and installed in the HDD or the flash memory of the driving support device 100A by attaching the removable storage medium (a non-transitory storage medium) to a drive device. Process details of the curve determiner 129 will be described later.

Flowchart

Figure 12:
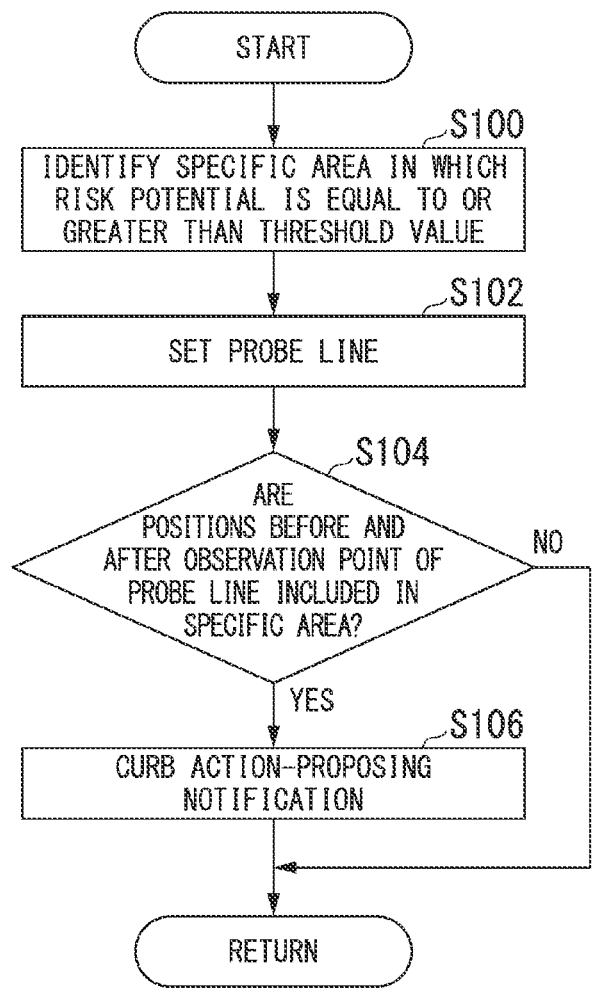
FIG. 12 is a flowchart showing an example of a routine which is performed by the driving support device.

FIG. 12 is a flowchart showing an example of a routine which is performed by the driving support device 100A. The routine which will be described below is an example and may be appropriately modified or another process may be added thereto.

Figure 13:
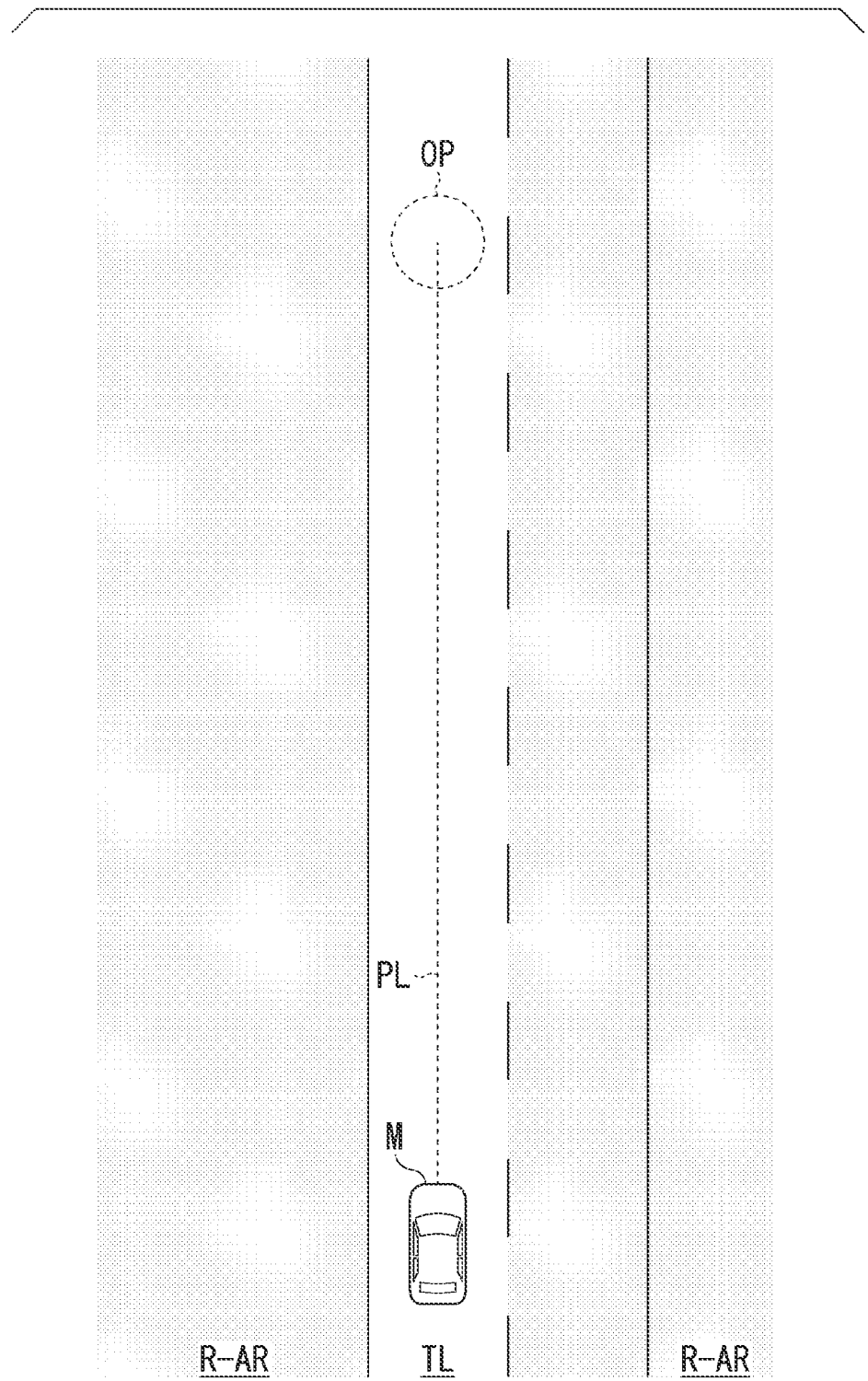
FIG. 13 is a diagram showing an example of a situation in which an observation point is not included in a specific area.

First, the curve determiner 129 identifies a specific area in which a risk potential is equal to or greater than a threshold value (Step S100). A specific area in which the risk potential is equal to or greater than the threshold value is an area which the vehicle M is to travel to avoid. For example, the curve determiner 129 recognizes a lane or a road on which the vehicle M travels on the basis of a recognition result from the recognizer 110 and identifies the specific area on the basis of the recognition result. For example, the curve determiner 129 identifies an area other than a traveling road on which the vehicle M travels as the specific area. The traveling road is an area in a lane in which the vehicle M travels. As shown in FIG. 13, an area other than a traveling road TL is a specific area R-AR.

Then, the curve determiner 129 sets a probe line (Step S102). As shown in FIG. 13, a probe line PL extending in the traveling direction of the vehicle M from the reference position of the vehicle M is set. A length of the probe line is determined according to a moving speed of the vehicle M. The length of the probe line is set, for example, according to a timing at which action-proposing notification is performed. For example, the length is a distance by which the vehicle M travels in 4 seconds or a time slightly longer than 4 seconds when a proposal for an event (for example, a risky object) is provided after 4 seconds. A speed for calculating the traveling distance may be determined on the basis of a current speed or acceleration of the vehicle M or a model for calculating speed change in the future which is stored in the storage device of the driving support device 100A in advance. The length of the probe line is calculated on the basis of the set time as described above.

Then, the curve determiner 129 determines whether positions before and after an observation point of the probe line are included in the specific area (Step S104). The observation point is, for example, a tip (OP) of the probe line or the vicinity of the tip as shown in FIG. 13. When the positions before and after the observation point of the probe line is not included in the specific area, this routine of the flowchart ends. For example, when the positions before and after the observation point OP is not included in the specific area as shown in FIG. 13, this routine of the flowchart ends.

When the positions before and after the observation point of the probe line are included in the specific area, the information provider 130 curbs provision of the action-proposing notification on the basis of the determination result of Step S104 (Step S106). For example, when the index value in the first embodiment has reached the third threshold value Th3 and the condition for providing the action-proposing notification has been satisfied (for example, when a risky object is present and the driver does not perform a predetermined action), the information provider 130 does not provide the action-proposing notification. When the condition for providing the action-proposing notification is satisfied for a predetermined time after the process of Step S106 has been performed, the information provider 130 may not necessarily provide the action-proposing notification. Then, this routine of the flowchart ends.

As described above, the driving support device 100A can provide a proposal associated with steering according to a situation of the vehicle M by not providing the action-proposing notification when a risky object is present forward in the traveling direction of the vehicle M in a first period in which the positions before and after the observation point of the probe line are included in the specific area and providing the action-proposing notification when a risky object is present forward in the traveling direction of the vehicle M in a second period in which the positions before and after the observation point of the probe line are not included in the specific area. Provision of the action-proposing notification may be curbed instead of not providing the action-proposing notification when a risky object is present forward in the traveling direction of the vehicle M in the first period. Curbing means that provision of the action-proposing notification is performed in a weaker mode than provision of the action-proposing notification which is performed when a risky object is present forward in the traveling direction of the vehicle M in the second period. Curbing means, for example, that a proposal for causing the driver to perform an action while seeing the surroundings or a proposal for causing the driver to perform an action in consideration of a curved road is provided.

As described above in the first embodiment, since the driving support device 100A does not provide an action-proposing notification when the driver of the vehicle M has performed an action for avoiding a risky object before the vehicle M approaches the risky object by a predetermined distance or closer (before the index reaches the third threshold value Th3) in the second period, it is possible to provide information in which the driver's intention is reflected. As described above in the first embodiment, when the driver does not see a risky object in the first period, the driving support device 100A can allow the driver to recognize the risky object by notifying the driver of presence of the risky object using an information providing device.

Figure 14:
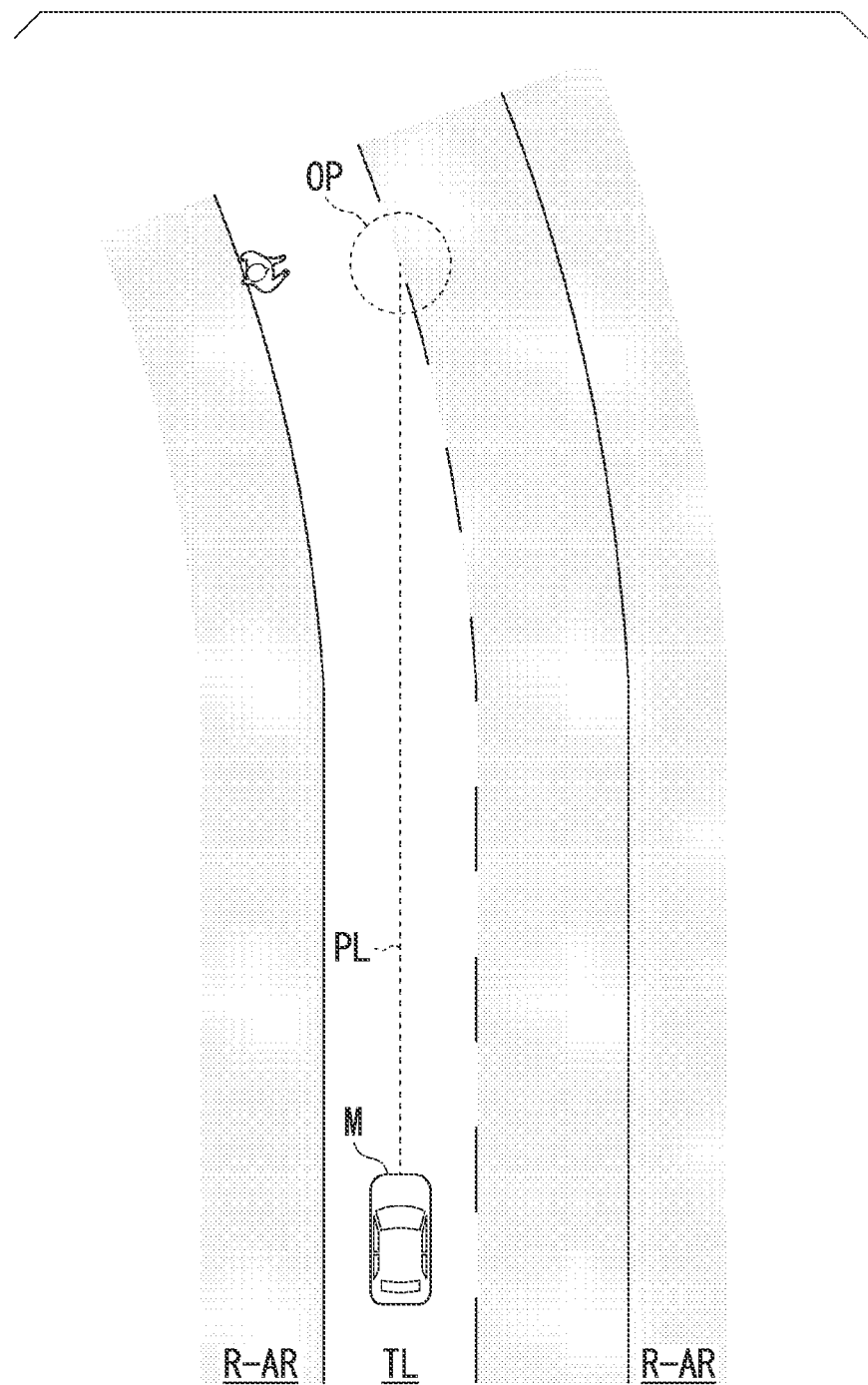
FIG. 14 is a diagram showing an example of a situation in which an observation point is included in a specific area.

FIG. 14 is a diagram showing an example of a situation in which the observation point is included in a specific area. For example, when the traveling road on which the vehicle M travels is a curved road and the observation point OP is included in a specific area R-AR as shown in FIG. 14, the information provider 130 does not provide an action-proposing notification even if the condition for providing the action-proposing notification is satisfied.

Figure 15:
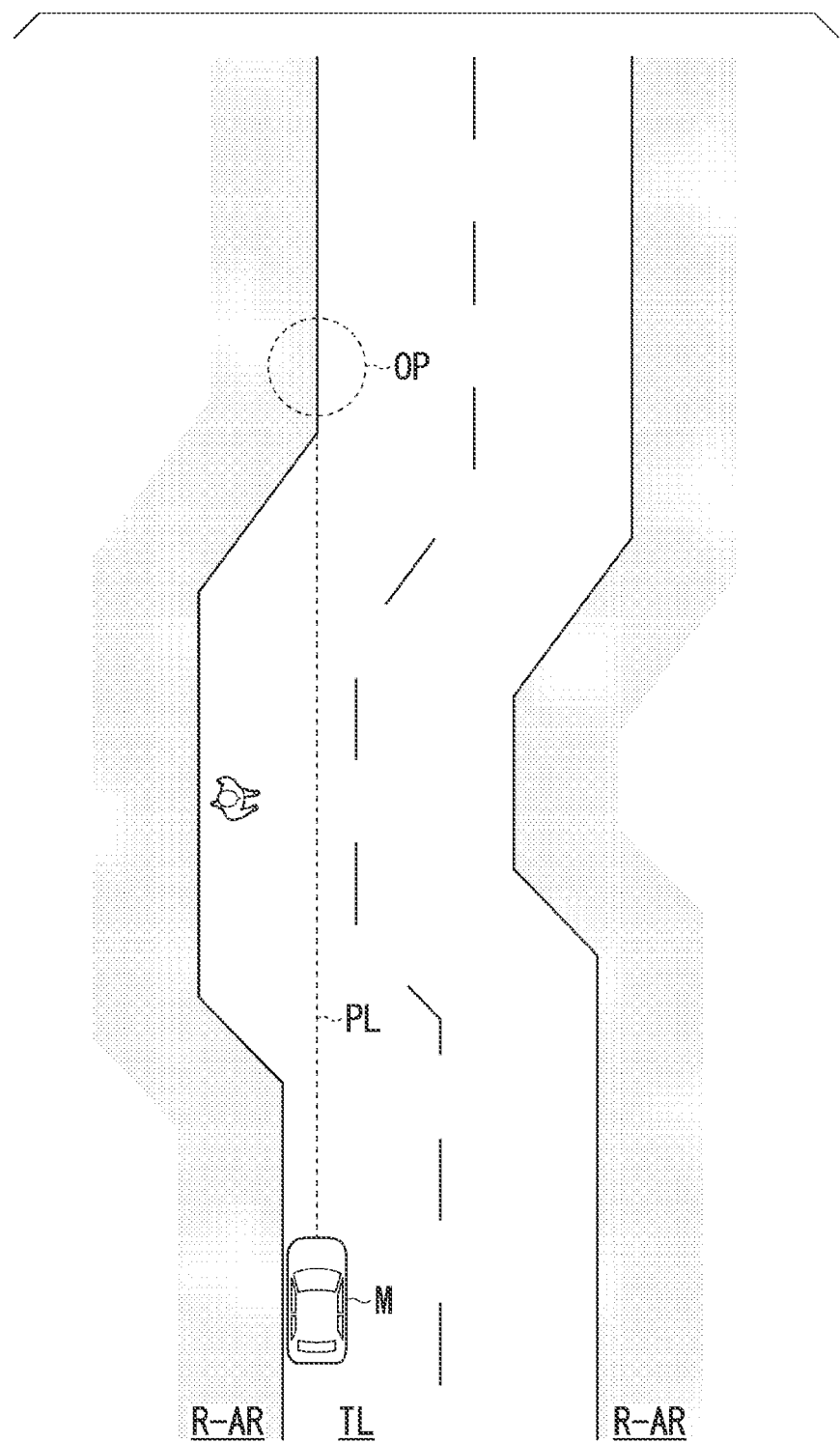
FIG. 15 is a diagram showing another example of a situation in which an observation point is included in a specific area.

FIG. 15 is a diagram showing another example of a situation in which the observation point is included in a specific area. For example, as shown in FIG. 15, when part of the traveling road on which the vehicle M travels has a curved shape (trapezoidal wave shape) and the vehicle M travels on the left side of the traveling road, the observation point OP may be included in a specific area R-AR. In this case, the information provider 130 does not provide an action-proposing notification even if the condition for providing the action-proposing notification is satisfied.

In the aforementioned examples, it is determined whether the observation point OP is included in the specific area, but provision of the action-proposing notification may be curbed when part of the probe line is determined to be included in the specific area R-AR instead thereof (or in addition thereto).

When the probe line crosses an edge of a lane in which the vehicle M is traveling (for example, a lane marking) or an edge of a road on which the vehicle M is traveling (for example, a curbstone or a guardrail), provision of the action-proposing notification may be curbed.

Here, when a risky object such as a traffic participant or an obstacle is present in front of the vehicle M and the driver of the vehicle M does not perform an action for avoiding the risky object while the driver is driving the vehicle M, it is preferable that notification, automatic control of the vehicle M, or guidance for performing an avoidance action be performed as a driving support for avoiding the risky object. When this driving support is performed, it is preferable that an operating condition be determined and the driving support be activated in a situation in which the driving support can be appropriately performed. For example, it is preferable that provision of a proposal be curbed in a road with a predetermined shape such as a curved road. Particularly, when an avoidance direction or a risk direction is intuitively provided using a sense of sight, a sense of touch, or an auditory sense, a driving support on a straight road is mainly performed. For example, when the aforementioned guidance is performed on a curved road, the driver may confuse whether the guidance is avoidance to one side of road lanes or absolute avoidance in the traveling direction of the vehicle M (for example, whether the guidance is avoidance for causing the vehicle to travel along a curved road or avoidance for avoiding a risky object). Accordingly, it is preferable that control different from that for a straight road be performed for a road with a predetermined shape such as a curved road or provision of a proposal associated with steering be curved.

For example, when a lane edge or a road edge is recognized and a shape of a road is identified from a radius of curvature of the recognized edge, a shape of a road with a simple curvature can be simply identified, but it may be difficult to determine the shape or a calculational load may be large for a road with a complex shape (for example, a trapezoidal wave road).

Therefore, the driving support device 100A according to this embodiment determines whether a proposal associated with steering is to be performed using the reference position of the vehicle M on the basis of the assumption that the vehicle M is caused to travel straight for a predetermined time as described above. In this way, the driving support device 100A can determine whether the vehicle M is traveling in a situation in which the proposal is provided with a very small calculational load.

According to the second embodiment, the driving support device 100A can more appropriately provide a proposal associated with steering by providing the driver of the vehicle M with a proposal associated with steering for avoiding a risky object present forward in the traveling direction of the vehicle M and providing the proposal on the basis of the reference position of the vehicle M based on the assumption that the vehicle M is caused to travel straight in the current traveling direction from the current position of the vehicle M for a predetermined time.

The aforementioned embodiments can be described as follows.

One or more control devices including:
a storage medium storing computer-readable instructions; and
a processor connected to the storage medium,
wherein the processor executes the computer-readable instructions to perform:
performing a first process when an index value indicating a degree of closeness to a risky object which is present in front of a mobile object is less than a first threshold value;
performing a second process different from the first process when the index value is equal to or greater than the first threshold value and less than a second threshold value greater than the first threshold value; and
performing a third process different from the first process and the second process when the index value is equal to or greater than the second threshold value,
wherein the third process includes a fourth process of proposing a driving operation for avoiding the risky object to a driver, and
wherein the fourth process is not performed when the driver has performed an action for reducing or releasing an operation of an operator instructing an accelerating operation for accelerating the mobile object.

The aforementioned embodiments can also be described as follows.

A control device including:
a storage medium storing computer-readable instructions; and
a processor connected to the storage medium,
wherein the processor executes the computer-readable instructions to perform:
delivering a proposal associated with steering for avoiding a risky object which is present in a traveling direction of a mobile object to a driver of the mobile object;
determining whether a reference position of the mobile object crosses a traveling road boundary in the assumption that the mobile object travels straight in the current traveling direction from a current position of the mobile object for a predetermined time; and
curbing delivery of the proposal when it is determined that the reference position crosses the traveling road boundary and delivering the proposal when it is determined that the reference position does not cross the traveling road boundary.

While exemplary embodiments of the present invention have been described above, the present invention is not limited to the embodiments and can be subjected to various modifications and substitutions without departing from the gist of the present invention.

What is claimed is:

1. A control device configured to perform:
performing a first process when an index value indicating a degree of closeness to a risky object which is present in front of a mobile object is less than a first threshold value;
performing a second process different from the first process when the index value is equal to or greater than the first threshold value and less than a second threshold value greater than the first threshold value; and
performing a third process different from the first process and the second process when the index value is equal to or greater than the second threshold value,
wherein the third process includes a fourth process of proposing a driving operation for avoiding the risky object to a driver, and
wherein the fourth process is not performed when the driver has performed an action for reducing or releasing an operation of an operator instructing an accelerating operation for accelerating the mobile object.

2. The control device according to claim 1, wherein the fourth process is not performed when the driver has performed the action before the index value reaches a third threshold value greater than the second threshold value, and
wherein the fourth process is performed when the index value has reached the third threshold value and the driver has performed none of the action, an action for decelerating the mobile object, and an action for causing the mobile object to avoid the risky object by operating an operator steering the mobile object before the index value reaches the third threshold value.

3. The control device according to claim 2, wherein the proposal continues to be delivered until the index value reaches the second threshold value when the driver has performed the action after having performed the fourth process.

4. The control device according to claim 1, wherein the operator is an accelerator pedal, and
wherein the fourth process is not performed when an amount of operation of the accelerator pedal becomes smaller by a predetermined value or more or an operation of the accelerator pedal stops.

5. The control device according to claim 1, wherein the fourth process is one or more of:
(1) a process of causing a display visible to the driver to display information indicating deceleration or a moving direction in which the mobile object travels to avoid the risky object;
(2) a process of notifying the driver of a proposal for a driving operation by speech;
(3) a process of operating an operator steering of the mobile object in a direction in which the mobile object travels to avoid the risky object; and
(4) a process of causing the operator steering of the mobile object or a seat belt of the driver to vibrate.

6. The control device according to claim 1, wherein an information provision device is controlled such that the driver is notified of information indicating that the risky object is present when it is estimated that the driver has not seen the risky object before the index value reaches a third threshold value greater than the second threshold value, and wherein the fourth process is performed when it is estimated that the driver has seen the risky object and the driver has not performed the action, an action for decelerating the mobile object, and an action for causing the mobile object to avoid the risky object by operating an operator steering the mobile object before the index value reaches the third threshold value greater than the second threshold value.

7. The control device according to claim 1, wherein the second process is performed instead of the fourth process when the index value reaches the second threshold value after the fourth process has been performed, and
wherein the second process includes one or both of a process of giving a warning indicating that the mobile object has approached the risky object to the driver and a process of automatically decelerating the mobile object.

8. The control device according to claim 7, wherein the first process is performed instead of the second process when the index value reaches the first threshold value after the second process has been performed, and
wherein the first process includes one or both of a process of decelerating the mobile object at a deceleration higher than that at the time of deceleration in the second process and a process of automatically controlling steering of the mobile object such that the mobile object moves beside the risky object.

9. A control method that is performed by a computer, the control method comprising:
performing a first process when an index value indicating a degree of closeness to a risky object which is present in front of a mobile object is less than a first threshold value;
performing a second process different from the first process when the index value is equal to or greater than the first threshold value and less than a second threshold value greater than the first threshold value; and
performing a third process different from the first process and the second process when the index value is equal to or greater than the second threshold value,
wherein the third process includes a fourth process of proposing a driving operation for avoiding the risky object to a driver, and
wherein the fourth process is not performed when the driver has performed an action for reducing or releasing an operation of an operator instructing an accelerating operation for accelerating the mobile object.

10. A non-transitory storage medium storing a program, the program causing a computer to perform:
performing a first process when an index value indicating a degree of closeness to a risky object which is present in front of a mobile object is less than a first threshold value;
performing a second process different from the first process when the index value is equal to or greater than the first threshold value and less than a second threshold value greater than the first threshold value; and
performing a third process different from the first process and the second process when the index value is equal to or greater than the second threshold value,
wherein the third process includes a fourth process of proposing a driving operation for avoiding the risky object to a driver, and
wherein the fourth process is not performed when the driver has performed an action for reducing or releasing an operation of an operator instructing an accelerating operation for accelerating the mobile object.

* * * * *